United States Patent [19]
Gittins et al.

[11] Patent Number: 5,859,965
[45] Date of Patent: Jan. 12, 1999

[54] METHOD AND APPARATUS FOR MAINTAINING DATA CONSISTENCY IN RAID

[75] Inventors: Robert S. Gittins, Woodland Park; Dale R. Passmore, Colorado Springs, both of Colo.

[73] Assignee: Sun Microsystems, Inc., Palo Alto, Calif.

[21] Appl. No.: 767,720

[22] Filed: Dec. 17, 1996

[51] Int. Cl.[6] .................................................. G06F 11/10
[52] U.S. Cl. ............................... 395/185.05; 395/182.04; 711/114; 371/10.2
[58] Field of Search ..................... 395/185.05, 182.04, 395/182.05; 711/114; 371/10.2

[56] References Cited

U.S. PATENT DOCUMENTS

| | | | |
|---|---|---|---|
| 5,488,731 | 1/1996 | Mendelsohn | 395/182.12 |
| 5,504,858 | 4/1996 | Ellis et al. | 395/182.04 |
| 5,522,031 | 5/1996 | Ellis et al. | 395/182.04 |
| 5,581,690 | 12/1996 | Ellis et al. | 395/182.04 |
| 5,701,304 | 9/1996 | Glover et al. | 395/182.04 |

OTHER PUBLICATIONS

A Case for Redundant Arrays of Inexpensive Disks (RAID) Patterson et al. (109–116), 1988.
Introduction to Redundant Arrays of Inexpensive Disks (RAID) Patterson et al. (112–117), 1989.

*Primary Examiner*—Robert W. Beausoliel, Jr.
*Assistant Examiner*—Pierre Eddy Elisca
*Attorney, Agent, or Firm*—James A. Pinto; William J. Kubida; Holland & Hart LLP

[57] ABSTRACT

A method and apparatus for storing associated data in a computing system having two or more storage devices arranged in a RAID configuration. The storage devices have a prewrite area for pre-storage of the data, and data region for persistent storage of the data. A scoreboard memory structure is created for monitoring the state of the prewrite area, and data in the prewrite area is conditionally invalidated based upon the information contained in the scoreboard memory structure. By conditionally invalidating the prewrite data, the write performance of the RAID storage system is improved.

15 Claims, 14 Drawing Sheets

Fig. 11A

DISK PREWRITE SLOTS — 66

COLUMN 1

| 203 BLK 5 CNT 3 |
| 0 |
| 0 |
| |

COLUMN 2

| 203 BLK 5 CNT 3 |
| 0 |
| 0 |
| |

PREWRITE SCORBOARD — 90

COLUMN 1

| 203 BLK 5 CNT 3 AVAILABLE |
| 201 BLK 6 CNT 1 UNUSED |
| 202 BLK 7 CNT 1 UNUSED |
| |

COLUMN 2

| 203 BLK 5 CNT 3 AVAILABLE |
| 201 BLK 6 CNT 1 UNUSED |
| 202 BLK 7 CNT 1 UNUSED |
| |

*Fig. 11C*

METHOD AND APPARATUS FOR MAINTAINING DATA CONSISTENCY IN RAID

CROSS REFERENCE TO RELATED APPLICATION

This patent application is related to the following co-pending, commonly-assigned U.S. patent application, the disclosure of which is expressly and specifically incorporated herein by reference in its entirety: "HOST-BASED RAID-5 AND NV-RAM INTEGRATION", by Robert S. Gittins and John R. Corbin, filed Apr. 15, 1996, Ser. No. 08/631,934.

BACKGROUND OF THE INVENTION

1. Field of the Invention

This invention relates to efficient management and storage of data in a RAID disk array device or a RAID disk array in a computing system. More particularly, this invention relates to optimization of invalidation of data and parity information in a prewrite area of a RAID disk array.

2. Description of the Background

In computing systems designed for large data processing and data storage applications, redundant storage devices are provided to enhance the integrity of data maintained on the system in the event of a failure of a storage device.

For example, RAID (Redundant Array of Independent Disks) technology, such as RAID-1, RAID-4, and RAID-5, utilizes an array of disk drives which contain data and parity information distributed across each disk in the array. The parity information is additional information stored on the disks and can be used to reconstruct data contained on any of the drives of the array in the event of a single drive failure. In this manner, these RAID disk arrays can improve the data integrity of the computing system by providing for data recovery despite the failure of a single disk drive. However, because of the redundancy of information stored in the device, these RAID devices have been characterized by slow processing times for a single logical "write" of data to the RAID device.

RAID architectures can include a RAID device which is a standalone self-contained storage unit having multiple disk drives included therein arranged in a RAID array. The RAID information processing is performed internally to the device and is transparent to the computing system attached thereto. Alternatively, a computing system may have an array of disks and perform the RAID information processing within the processor of the computing system. Throughout this application, these architectures are referred to interchangeably, and the terms RAID device and RAID disk array are used interchangeably.

Regardless of the RAID architecture employed, data and parity information must be synchronously maintained in order to prevent corruption of data. There is a chance that parity and data for a region of a disk may get out of synchronization due to a system failure or crash. When this happens there is no indication of the problem until a disk drive fails, and the data returned on reads and writes from the RAID device will be incorrect.

In order to keep parity and data synchronized at all times, all write operations can be first placed in a "prewrite" area, having numerous prewrite slots, for temporary persistent storage, and then written to the actual logical blocks of the disk. This guarantees that if the host computer fails or crashes, or if the RAID device crashes, the data and parity can be kept in synchronization. The prewrite process uses the following steps:

1) write the data and parity to a prewrite area;
2) write the data and parity to actual logical blocks of the disks;
3) invalidate the data and parity in the prewrite area.

The "invalidation" step three is required to prevent data in the prewrite area from being erroneously backed up and corrupted by a system crash. Invalidation is defined as marking the prewrite data/parity as invalid or non-usable, preventing the information from being replayed upon initialization of the RAID array. Invalidation is performed after the parity and data stored in the prewrite slots have been physically written to their proper physical location on the RAID disk array. For example, a tag can be placed over each prewrite slot after the data/parity has been written to the disk indicating that the data/parity in the prewrite area is no longer valid and should not be used.

This unconditional invalidation step is expensive in time and performance, as it requires a separate disk write operation. The performance cost can be up to approximately 10 milliseconds per logical write operation to the RAID disk array.

FIG. 1 shows the steps disclosed in the co-pending application, "HOST-BASED RAID-5 AND NV-RAM INTEGRATION", referenced above, for performing a single "logical" write of new data in a RAID-5 device.

Operation 20 reads the old data from the disk, while operation 22 reads the old parity from the disk. Operations 20 and 22 are needed to calculate the new parity information. Operation 24 generates the new parity information by first removing the old data from the parity information, which can be achieved by an exclusive-OR operation. The new parity information is then generated by including the new data into the parity information, which can also be achieved using an exclusive-OR calculation.

Having calculated the new parity information corresponding to the new data, operation 26 records or "prewrites" the new data and the new parity to a prewrite region of the disk. In this manner, if the computing system is interrupted or if a single disk in the RAID array fails before the new data and new parity are both completed written to the disk, the new parity/new data information will always be synchronized. As previously explained, synchronization between data and parity is needed to correctly reconstruct data stored on a failed disk drive.

Having permanently recorded the new data and new parity in the prewrite area of the disk, this information can now be transferred to the respective storage locations on the disk drives. Operation 28 writes the new data to the disk, and operation 30 writes the new parity information to the disk. In this manner, both the new data and the new parity are now synchronously maintained on the disk drive.

Operation 32 marks the logical write operation to the RAID device as complete. This operation would include invalidating the data and parity information stored by operation 26 in the prewrite area of the disk. Upon a system failure, the data and parity information which are stored in the prewrite area can be used to restore data if that prewrite data/parity has not been marked invalid.

The invalidation step requires two write operations—one write operation to mark the prewrite data as invalid, and one write operation to mark the prewrite parity as invalid. This is in addition to the six disk input/output operations previously described. Hence, one logical write of new data to the RAID device would require eight physical disk input/output operations to the RAID device, a costly process.

What is needed is a device and method which is capable of minimizing the number of invalidating write operations while simultaneously ensuring the synchronization between parity and data on the RAID device.

SUMMARY OF THE INVENTION

In accordance with this invention, the above problems have been solved by maintaining a scoreboard memory structure to monitor the state of the prewrite slots in the prewrite area of the storage devices, and detecting the conditions under which an invalidation of the prewrite slots should occur. In this manner, the present invention removes the need to unconditionally invalidate prewrite areas by detecting when invalidation is necessary.

New prewrite slots are allocated based on the contents of the scoreboard. The scoreboard also permits overlapping prewrites to be detected, and only the overlapping prewrite slots are invalidated, thereby reducing the number of invalidation operations performed by the RAID device.

Disclosed herein is a method for writing new data in a computing system having a system memory and at least two storage devices arranged in a RAID configuration. The first and second storage devices each have prewrite slots for pre-storage of data and parity information. A scoreboard structure in the system memory of the computing system is provided for tracking a state of said prewrite slots. One of the prewrite slots is allocated for recording the new data in the first storage device and for recording the new parity in the second storage device. The scoreboard memory structure is used to detect an overlapped prewrite slot, and for conditionally invalidating the overlapped prewrite slot. The new parity is computed from the new data, an old parity value, and an old data value stored in the computing system. The new data is stored in the prewrite slot allocated by the allocation step to the first storage device and the new parity to the second storage device. Upon completion of the storage of the data and parity to the prewrite slots, the new data is written to the first storage device, and the new parity is written to the second storage device.

In an embodiment of the invention, an identification variable is created for associating the data and parity in the prewrite slots across the first and second storage devices, and a block variable is assigned to each identification variable corresponding to a range of blocks occupied with the storage devices. The block variable of a prewrite slot are compared to a block variable of an allocated prewrite slot to detect if the block variable of the prewrite slot matches the block variable of the allocated prewrite slot. If so, the prewrite slot is marked as invalid and should not be used for data recovery.

The scoreboard memory structure can be formed to contain a set of state variables associated with each of the prewrite slots. The set of state variables can comprise an UNUSED state variable, an ACTIVE state variable, an AVAILABLE state variable, and an INVALIDATING state variable.

In a machine implementation of the invention, an apparatus for storing data in a computing system has a first and second storage device, a memory structure, a detection module, and allocation module, and an invalidation module. The first and second storage device each have prewrite slots for prestorage of the data. The memory structure is coupled to the storage devices for tracking a state of the prewrite slots. The detection module is coupled to the memory structure for monitoring the memory structure to detect when any prewrite slots should be marked invalid. The allocation module is coupled to the memory structure and to the storage devices for allocating prewrite slots for pre-storing the data in a prewrite slot. The invalidation module is coupled to the detection module and to the storage devices for marking any prewrite slots invalid responsive to the detection module.

The apparatus of the present invention can be used where the storage devices are arranged in a RAID-1, RAID-4, or RAID-5 configuration.

The above computer implemented steps in another implementation of the invention are provided as an article of manufacture, i.e., a computer storage medium containing a computer program of instructions for performing the above-described steps.

The great utility of the present invention is an improvement in the performance of a RAID disk array achieved by reducing the number of invalidation operations required for each logical write operation to the disk array.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 11A shows the initial conditions for an example of the operation of the present invention.

FIG. 11C shows a continuation of the example of FIGS. 11A and 11B of the operation of the present invention.

DETAILED DESCRIPTION OF PREFERRED EMBODIMENTS

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

The present invention removes the need to unconditionally invalidate prewrite areas by detecting when invalidation is necessary. A prewrite scoreboard of previous prewrites is maintained and new prewrite slots are allocated based on the contents of the scoreboard. The scoreboard also permits overlapping prewrites to be detected, and only the overlapping prewrite slots are invalidated, thereby reducing the number of invalidation operations performed by the RAID device. The present invention can be used in various RAID level architectures, such as RAID-1, RAID-4, and RAID-5.

The prewrite scoreboard tracks the states of the prewrite slots of the physical disk. A detection module monitors the scoreboard and detects the conditions under which an invalidation of data/parity in the prewrite slots of the physical disk should occur. An allocation module determines the next prewrite slot to be used for storage of data and parity. An invalidation module, coupled to the detection module, performs the invalidation of the old data and old parity in a prewrite slot under the direction of the detection module.

Figure 1:
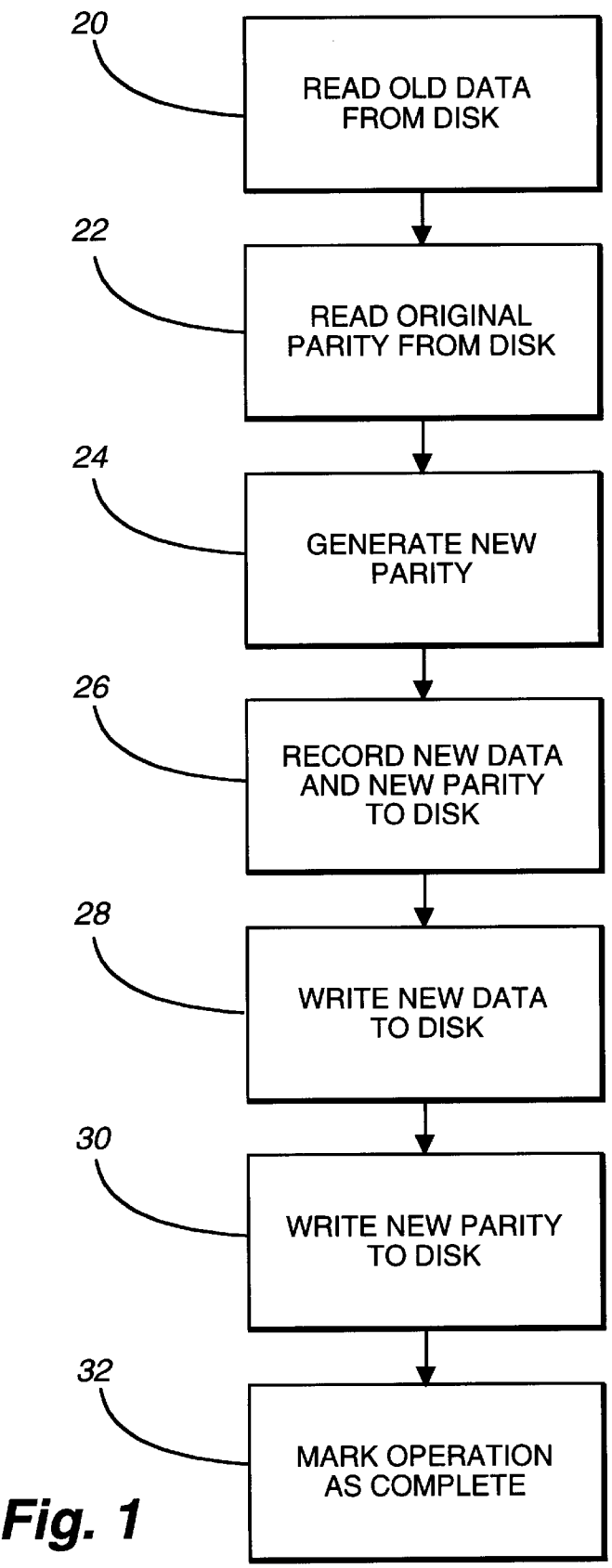
FIG. 1 illustrates the logical operations performed to write new data in a RAID-5 disk array.
Figure 2:
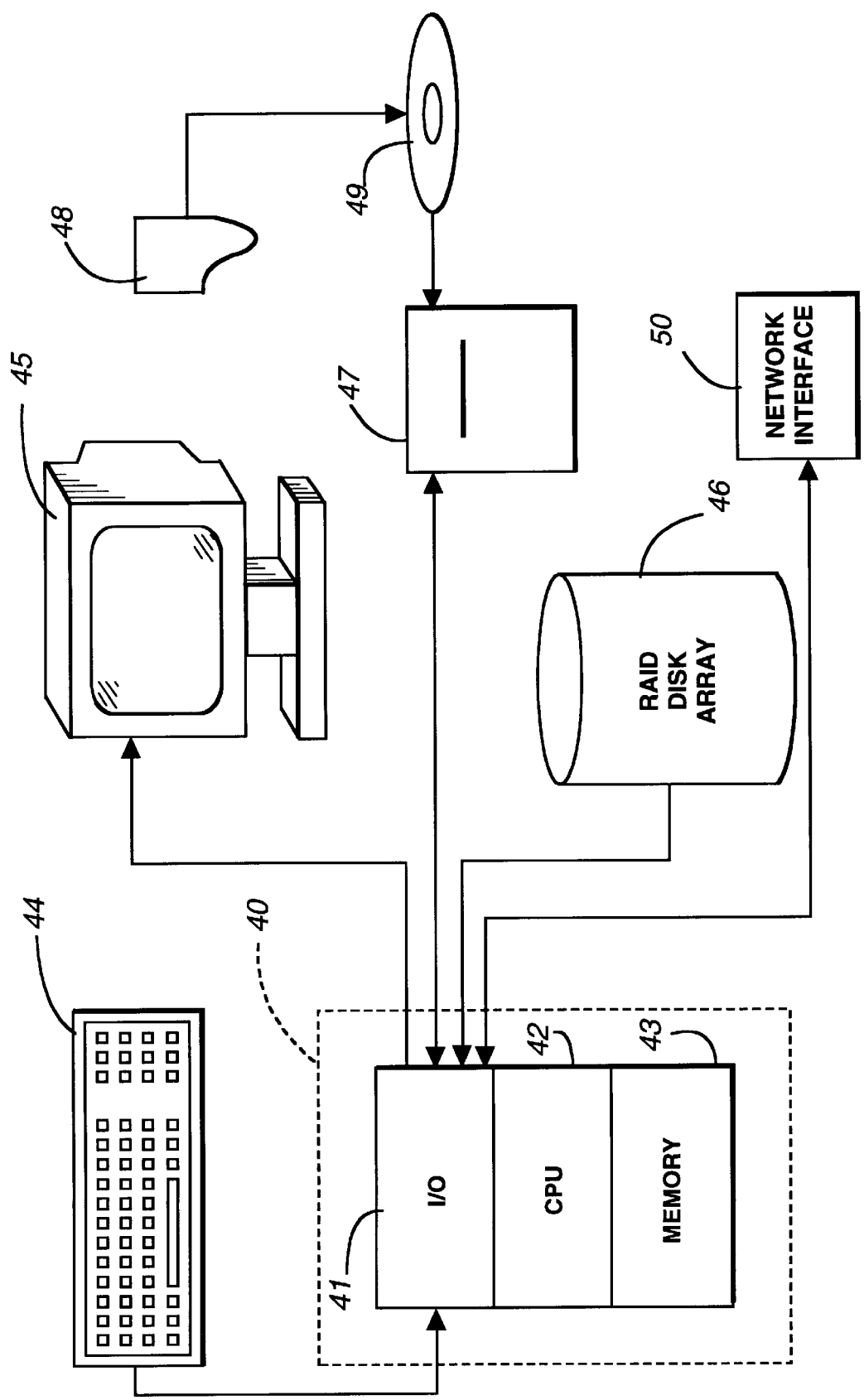
FIG. 2 illustrates a computing system to perform the computer implemented steps in accordance with the invention.

The operating environment in which the present invention is used encompasses a standalone computing system as well as the general distributed computing system. In the distributed computing system, general purpose computers, workstations, or personal computers are connected via communication links of various types, in a client-server arrangement. Programs and data, many in the form of objects, are made available by various members of the system. Some of the elements of a standalone computer or a general purpose workstation are shown in FIG. 2, wherein a processor 40 is shown, having an input/output (I/O) section 41, a central processing unit (CPU) 42 and a memory section 43. The I/O section 41 is connected to a keyboard 44, a display unit 45, a disk storage unit 46, a network interface 50, and a CD-ROM drive unit 47. The CD-ROM unit 47 can read a CD-ROM medium 49 which typically contains programs 48 and data. The computer program products containing mechanisms to effectuate the apparatus and methods of the present invention may reside in the memory section 43, or on the disk storage unit 46, or on the CD-ROM 49 of such a system. Examples of such systems include Sparc Systems offered by Sun Microsystems, Inc., personal computers offered by IBM Corporation and by other manufacturers of IBM compatible personal computers, and systems running the UNIX operating system or Solaris™ operating system.

Throughout this application, the term disk, drive, disk column, or the like includes any storage device to persistently maintain information in a computing system. An array is defined as two or more of such storage devices.

As shown in FIG. 2, the disk storage unit 46 is a RAID disk array which can be composed of individual disks arranged in a RAID disk array, or a RAID standalone storage device. From the prospective of the computing system, the disk storage unit 46 appears as a single logical disk drive, although it is physically implemented as a plurality of disk drives in a RAID array. The operations of RAID disk arrays are described in detail in the publication *RAID: High Performance, Reliable Secondary Storage*, by Peter Chen, et al., published in ACM Computing Surveys, Oct. 29, 1993, and is hereby expressly incorporated by reference in its entirety.

Figure 3A:
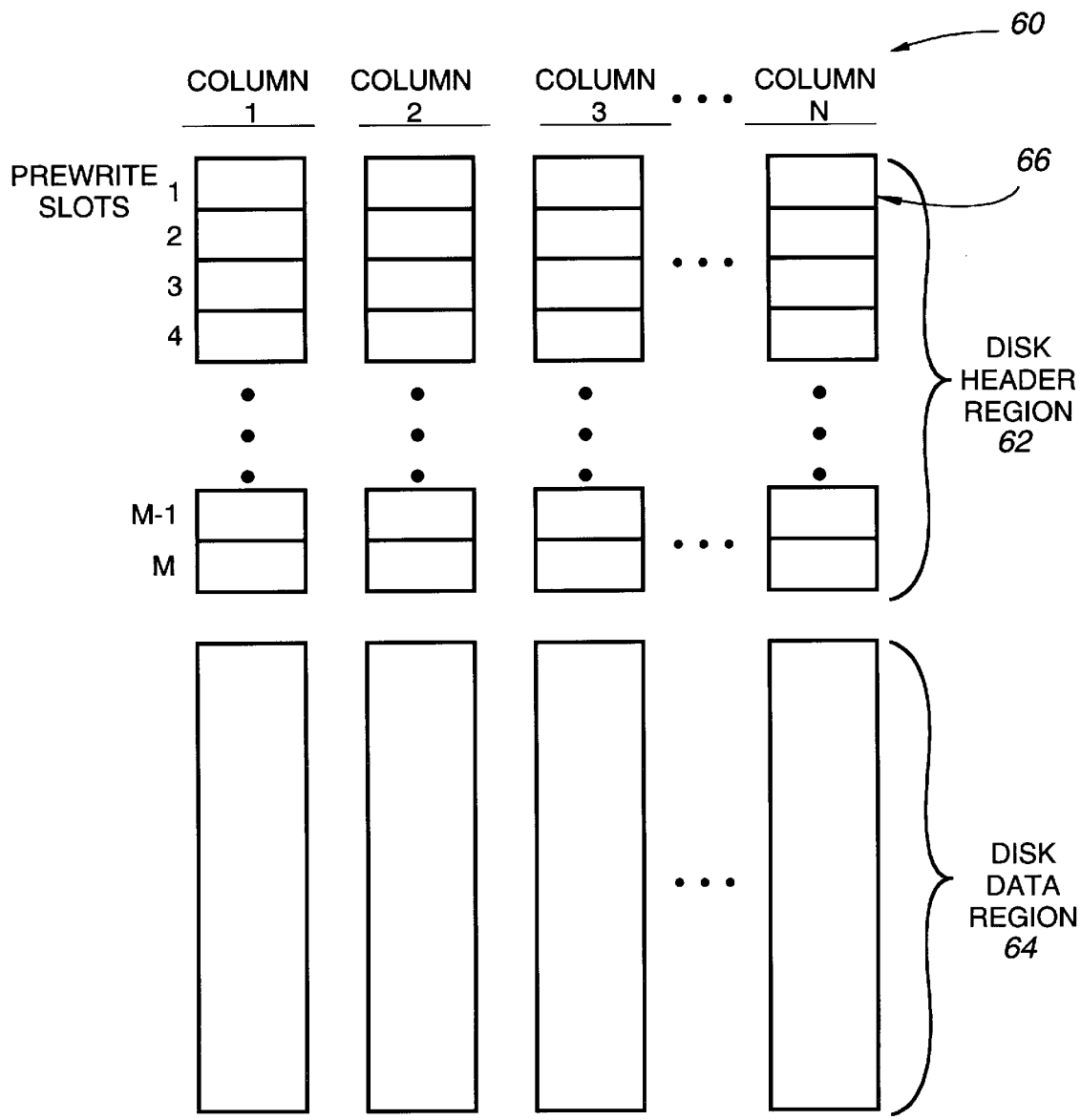
FIG. 3A illustrates an N-column disk array having a disk header region and a disk data region, with the disk header region having M prewrite slots therein.

FIG. 3A shows the arrangement of RAID disk array 46 having a plurality of N single disks 60, hereinafter referred to interchangeably as disks, columns or disk columns. Each of the disk columns 60 is divided into a disk header region 62 and a disk data region 64. The disk header region 62 is used, in accordance with the present invention, for storage of the prewrite information into prewrite slots 66. As shown in FIG. 3A, there are M prewrite slots 66 in the disk header region. These prewrite slots are used for pre-storage of the information on the disk.

For each write of new data to the RAID device 46, there is both a corresponding prewrite of new data to a prewrite slot in a first disk column 60, and a prewrite of parity to another prewrite slot in a second disk column 60. Hence, pairs of prewrites slots correspond to one logical write to the disk array 46. Each logical write will therefore involve at least two disk columns 60 and at least two prewrite slots 66. In this sense, the parity and data are "associated data" whose association must be maintained prior to writing the associated data to the disk columns.

While the prewrite information is stored in the disk header region 62 for each disk, it is understood that the actual location of the disk region designated for the prewrite information is a matter of choice dependent on the particular implementation chosen, and will not limit the scope of the present invention.

Figure 3B:
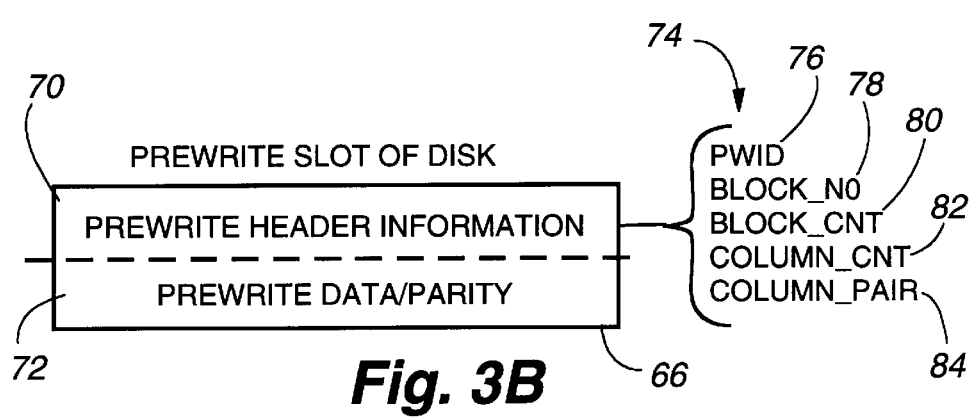
FIG. 3B illustrates a prewrite slot and variables associated therewith of a single disk column in the array of FIG. 3A.

FIG. 3B illustrates the contents, in accordance with the present invention, of each prewrite slot 66 shown in FIG. 3A. In particular, prewrite slot 66 has prewrite header information 70 and prewrite data/parity information 72. The header information 70 includes prewrite header variables 74, such as prewrite ID 76 (PWID), block number 78 (block_no), block count 80 (block_cnt), column count 82 (column_cnt), and column pair 84 (column_pair).

The function and purpose of the variables 74 shown in FIG. 3B will now be described. Prewrite ID 76 (PWID) represents the number of logical writes issued to the RAID device. A prewrite ID is a logical identifier used to associate parity and data for a single logical write operation to the RAID device. In one embodiment of the present invention, the prewrite ID can be a 64 byte value where zero represents an invalid prewrite slot. A counter can be employed to assign sequential PWIDs for each new write operation processed by the RAID device.

The block number (block_no) 78 corresponds to the physical or logical block number of the disk column 60 where the actual data/parity will be placed in the disk data region 64 of the RAID device 46 (FIG. 3A). Each disk column 60 has numerous blocks associated therewith. In this sense, the block_no 78 operates like an index pointing into the disk data region 64 of a single disk column 60 (FIG. 3A). The block count (block_cnt) 80 represents the total number of blocks used in this write operation represented by the prewrite ID. The block_cnt 80 operates like an offset from the index of the block_no 78. As will be described below, both the block_no and the block_cnt are used to detect the conditions under which the invalidation operation should be performed.

The column count (column_cnt) 82 represents the number of disk columns 60 involved in the logical write identified by the prewrite ID. As will be described below, the column count can have a value of one to N, where N is the total number of disk columns in the RAID device 46. The column pair (column_pair) 84 indicates the other column which is part of the prewrite pair. As will be described below, the column-pair variable can have the value of one to N where there are N disk columns in the RAID device; a value of −1 indicates that all N disk columns of the RAID device are used in the logical write identified the prewrite ID.

In accordance with the present invention, there are two "write" modes which could be supported: 1) normal write mode, and 2) full-line write mode. Normal write mode involves two disk columns and is generally used for storing a normal amount of data to the RAID device. The full-line write mode is an optimized operating mode wherein data will be written to each disk column 60, known as a full line, of the RAID array. Full-line write mode is an optimized mode because the old parity and data is not read since all of the disk columns in the array are being used, the old parity and data is not needed to calculate the new parity. A full-line write operation will never be performed if a disk error in the RAID array has been detected.

In the normal write mode, the prewrite ID is obtained by incrementing a counter of the prewrite IDs, and the remaining variables 74 are appropriately entered into the prewrite slot 66. For a full-line write operation, the pair column variable is set to −1 and the column count variable is set to the total number of columns in the RAID array. If there is a failure in a single disk column, the pair column variable 84 is set to zero, and the column count variable 82 is set to one, indicating that an error exists in the other disk column of the prewrite pair.

Figure 4A:
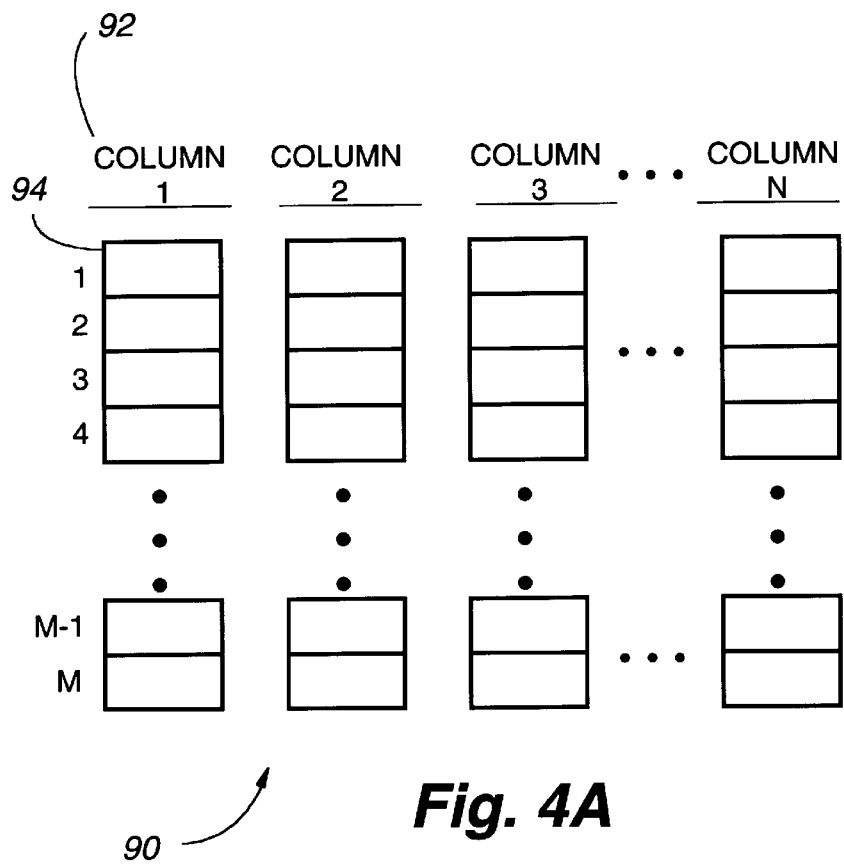
FIG. 4A illustrates the prewrite scoreboard of the present invention for tracking the state of the prewrite slots of FIG. 3A.
Figure 4B:
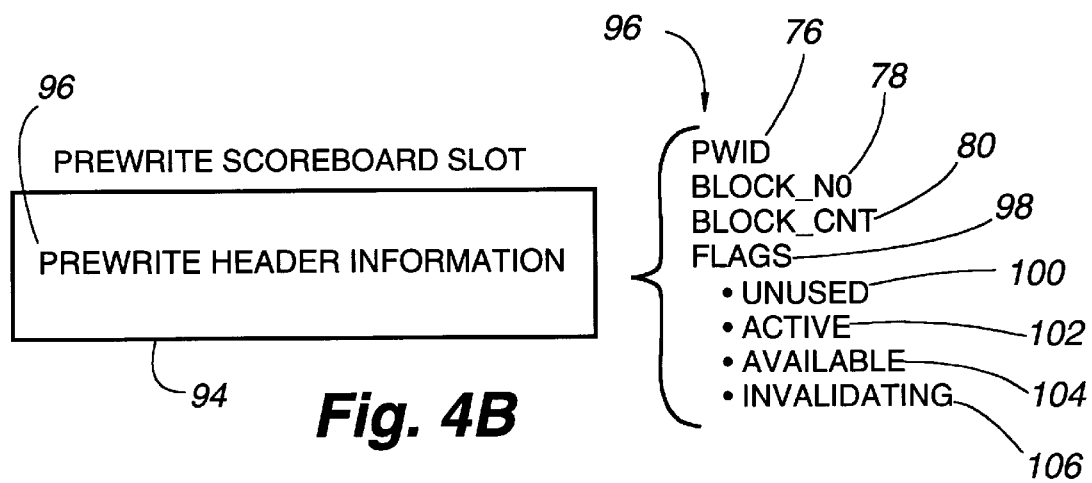
FIG. 4B illustrates a prewrite scoreboard slot and variables associated therewith in accordance with the invention.

Now referring to FIGS. 4A and 4B, the prewrite scoreboard 90 of the present invention is illustrated. FIG. 4A shows the prewrite scoreboard 90 having scoreboard columns 92 and scoreboard prewrite slots 94. The scoreboard is a memory structure. The total number of columns 92 corresponds to the total number of columns of the RAID disk array 46 shown in FIG. 3A. Likewise, the total number of prewrite slots 94 corresponds to the number of prewrite slots 66 of the RAID device also shown in FIG. 3A. Referring to FIG. 4B, each scoreboard prewrite slot 94 has scoreboard prewrite header information or variables 96 contained therein. These variables are essentially a copy of the variables contained in the physical prewrite slots 66 of the RAID device.

In accordance with the present invention, the prewrite scoreboard 90 is maintained in the memory of the computing system. In this manner, accesses to the prewrite scoreboard can occur in a very short period of time, typically on the order of a few processor clock cycles of the computing system. These access times to the scoreboard maintained in memory are orders of magnitude shorter than the time required to access data stored on a persistent magnetic storage media such as a disk drive.

It is understood that the structure or layout of the prewrite scoreboard 90 can be implemented in a variety of different forms, such a table structure or a list, in the memory of the computing system.

Referring to FIG. 4B, the scoreboard prewrite header variables 96 include the prewrite ID 76, block_no 78, and block_cnt 80 of the prewrite slot 66 (FIG. 3B). Additionally, the scoreboard variables 96 include a set of flags 98 indicating the states of the prewrite slots 66. These flags include an UNUSED state flag 100, an ACTIVE state flag 102, an AVAILABLE state flag 104, and an INVALIDATING state flag 106. As will be described in detail below, these flags are used to track the state of the prewrite slots in the disk columns.

A mutual exclusion lock ("mutex"; not shown) can be utilized to ensure that the prewrite scoreboard 90 is accessed in single threaded operation only. In this manner, any module reading or writing to the prewrite scoreboard 90 will have exclusive read and write access to the scoreboard upon obtaining the mutex on the scoreboard. Each access to the contents of the scoreboard should be performed under the mutex. The mutex should then be released when any access operations have completed.

Figure 5:
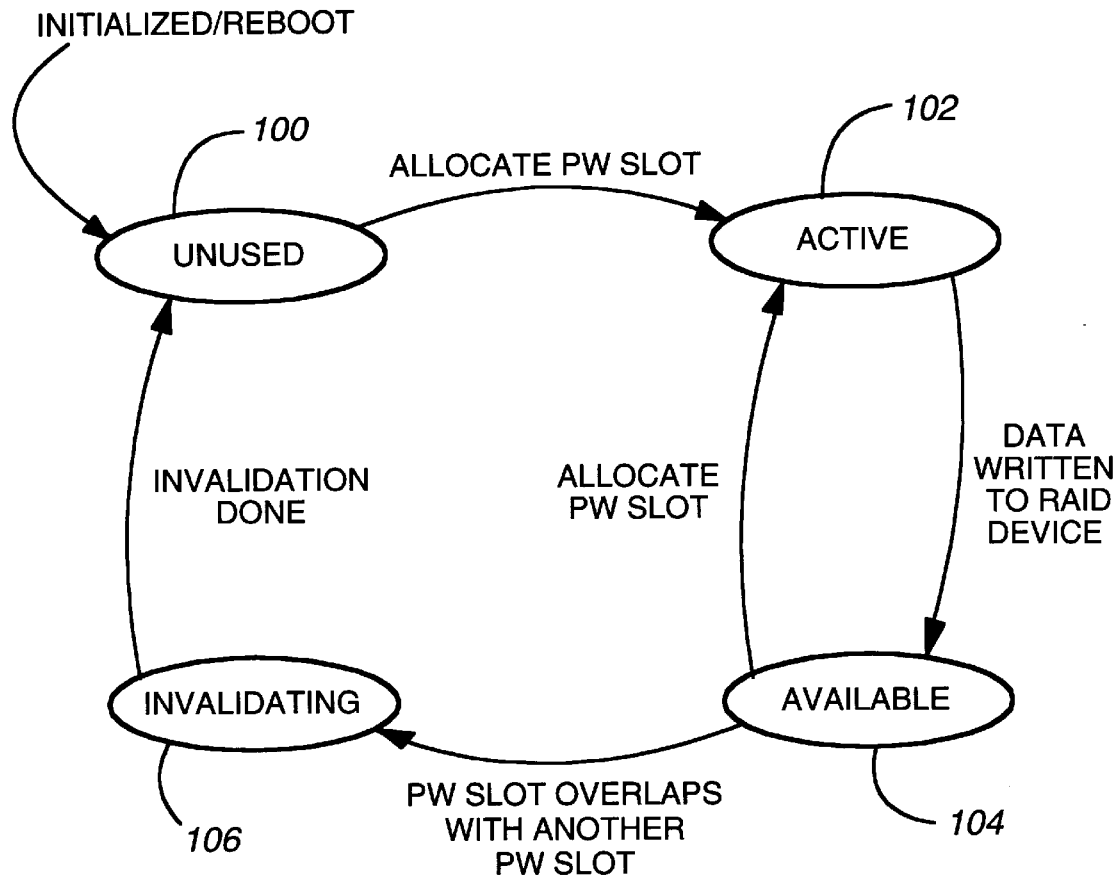
FIG. 5 illustrates a state diagram of the states of a prewrite slot in the scoreboard of FIGS. 4A and 4B of a preferred embodiment of the present invention.

FIG. 5 show a state diagram of the prewrite slot flags. This state diagram corresponds to the status of a single prewrite slot 66 in the RAID array. The UNUSED state 100 indicates that this prewrite slot has not been used or has been recently invalidated on the disk (i.e., the PWID of the prewrite slot is now zero). The ACTIVE state 102 indicates that this prewrite slot is currently being used to satisfy a write operation of the RAID device. The AVAILABLE state 104 indicates that the prewrite slot has data therein, but there is no active write operation associated with the data contained in the prewrite slot. The INVALIDATING state 106 indicates that this prewrite slot is currently being invalidated.

As shown in FIG. 5, the UNUSED state 100 is entered upon initialization or rebooting of the computing system (i.e., each prewrite slot is initialized in the scoreboard as unused). The ACTIVE state 102 is then entered once the prewrite slot has been allocated to store prewrite data or parity information. Upon the data/parity being written to the RAID device, the state of the prewrite slot changes to the AVAILABLE state 104. At this point, the prewrite slot can again become ACTIVE if it is again allocated. However, if the AVAILABLE prewrite slot overlaps with another prewrite slot presently ACTIVE, then this AVAILABLE prewrite slot must be invalidated and the prewrite slot state correspondingly changes to the INVALIDATING state 106. Upon the invalidation operation being complete, the state of the prewrite slot again becomes UNUSED.

Figure 6:
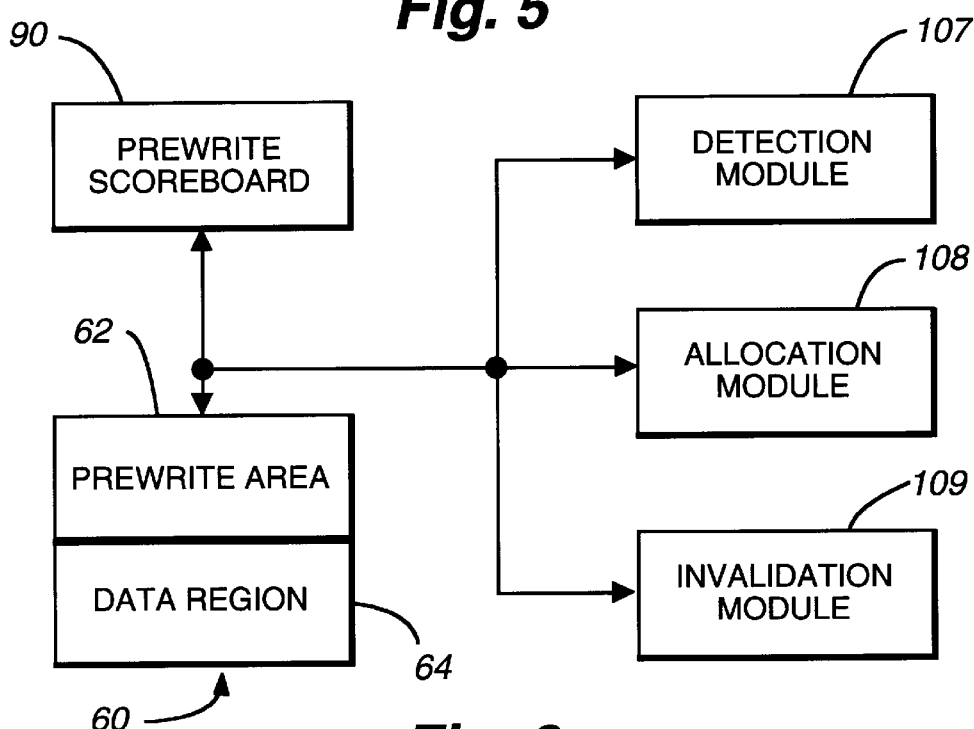
FIG. 6 illustrates a block diagram of an embodiment of the present invention showing the detection module, the allocation module, and the invalidation module.

FIG. 6 shows a block diagram of an embodiment of the present invention. Disk 60 of the RAID device has prewrite area 62 for storing prewrite information, and data region 64 for storing data and parity. Prewrite scoreboard 90 tracks the disk contents of prewrite area 62. Detection module 107 monitors the scoreboard 90 for conditions under which an invalidation of a prewrite slot must occur. Invalidation module 109, coupled to detection module 107 and prewrite area 62, invalidates any prewrite slot in the prewrite area 62 as directed by the detection module 107. Allocation module 108 determines, based on the contents of the scoreboard 90, which prewrite slot should be used to satisfy a logical write operation to the RAID device. The logic implemented by each of these modules is explained with reference to FIGS. 7 to 11C.

FIGS. 7–12B illustrate the logical operations of the present invention. With respect to FIG. 7, the logical operations for writing new data to the RAID disk array, in accordance with an embodiment of the present invention, is illustrated. Operation 110 reads the old data from the disk, while operation 112 reads the original parity from the disk. These operations are needed to calculate the new parity which will be stored on the disk with the new data. Operation 114 generates the new parity by first removing the old data from the original parity through an exclusive-OR operation. The new parity is then generated by including the new data into the resulting value through the exclusive-OR calculation.

Allocation operation 116 allocates a prewrite slot for recording the new parity and the new data to the disk. Allocation operation 116 utilizes the prewrite scoreboard 90 to determine which prewrite slots are available for use to satisfy the logical write operation of the RAID device.

Detection operation 118 detects any overlaps in the disk blocks associated with the prewrite slots which would require invalidation of the prewrite data contained in the RAID device. In this context, and as further explained below, an "overlap" condition occurs when the disk blocks associated with the present write of data will occupy a disk block which already contains data/parity corresponding to a preceding prewrite block. The block_no 78 and block_cnt 80 variables (FIG. 4B) can be used to detect the overlap condition.

Conditional invalidation operation 120 conditionally invalidates the parity and data in the detected overlap slots. When a block has been detected as overlapping by detection operation 118, the present prewrite operation will utilize the immediately-overlapping slot, and operation 120 will invalidate any additional old prewrite data/parity in other slots. In other words, if the present write operation requires one prewrite slot, and there are three prewrite slots which have old related data/parity therein, the present prewrite operation would utilize the first prewrite slot (effectively overwriting the old data/parity therein) and the remaining two prewrite slots would be invalidated by operation 120.

Operation 122 then records the new data and the new parity to the disk at the prewrite slot allocated by operation 116. Hence, the new data and new parity has now been successfully prewritten to the RAID device, thereby maintaining synchronization between data and parity as previously explained. Operation 124 then writes the new data to the data region of the disk, and operation 126 writes the new parity to the data region of the disk.

Figure 7:
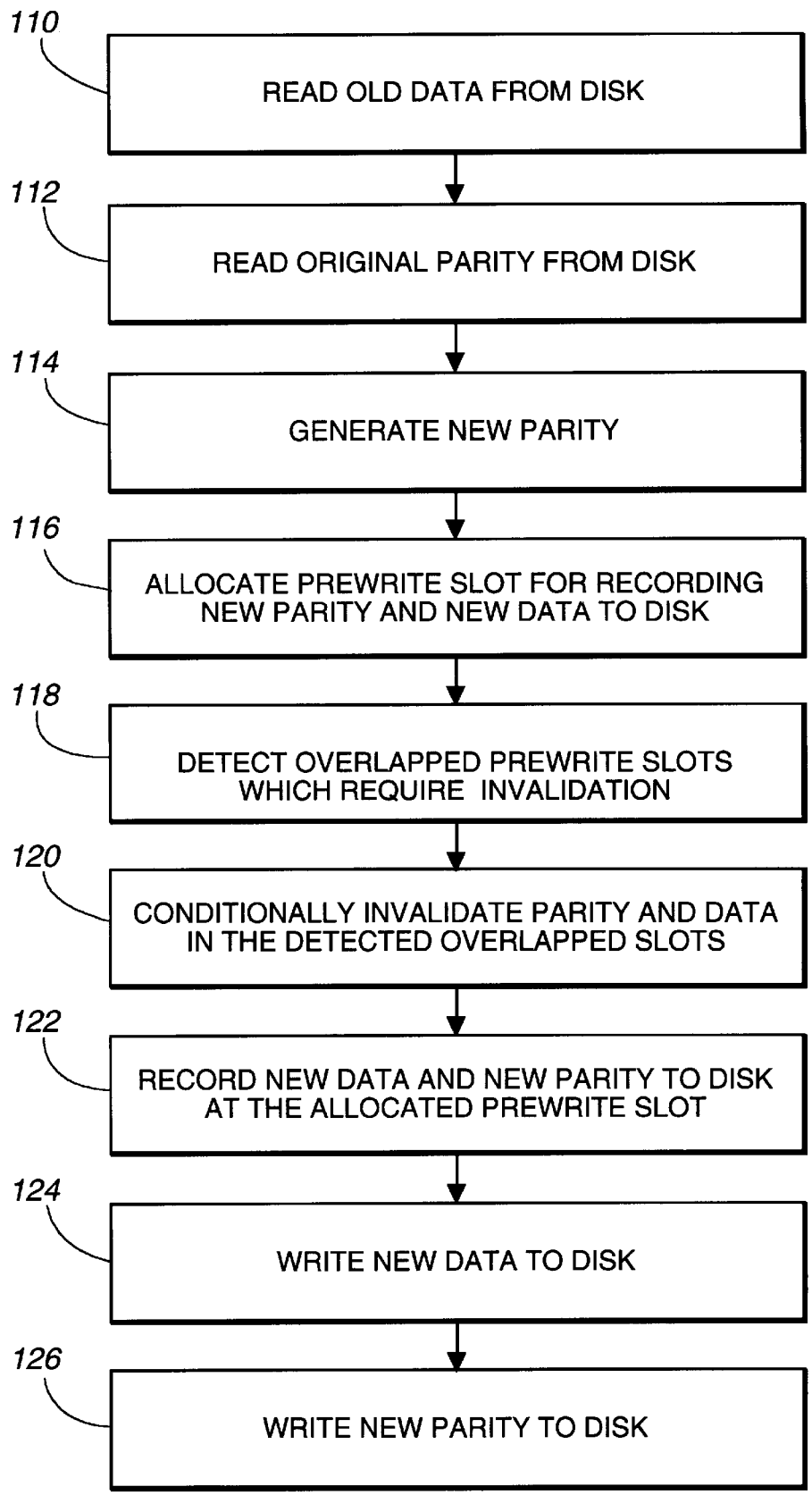
FIG. 7 illustrates the logical operations performed to write new data in a RAID-5 disk array in accordance with the present invention.

As can be seen by FIG. 7, the unconditional invalidation operations previously associated with writing new data/parity to the RAID device are no longer required under the present invention. Instead, operations 116, 118, and 120 minimize the number of invalidation operations which must be performed, thereby improving the speed of performance of the RAID device.

Figure 8:
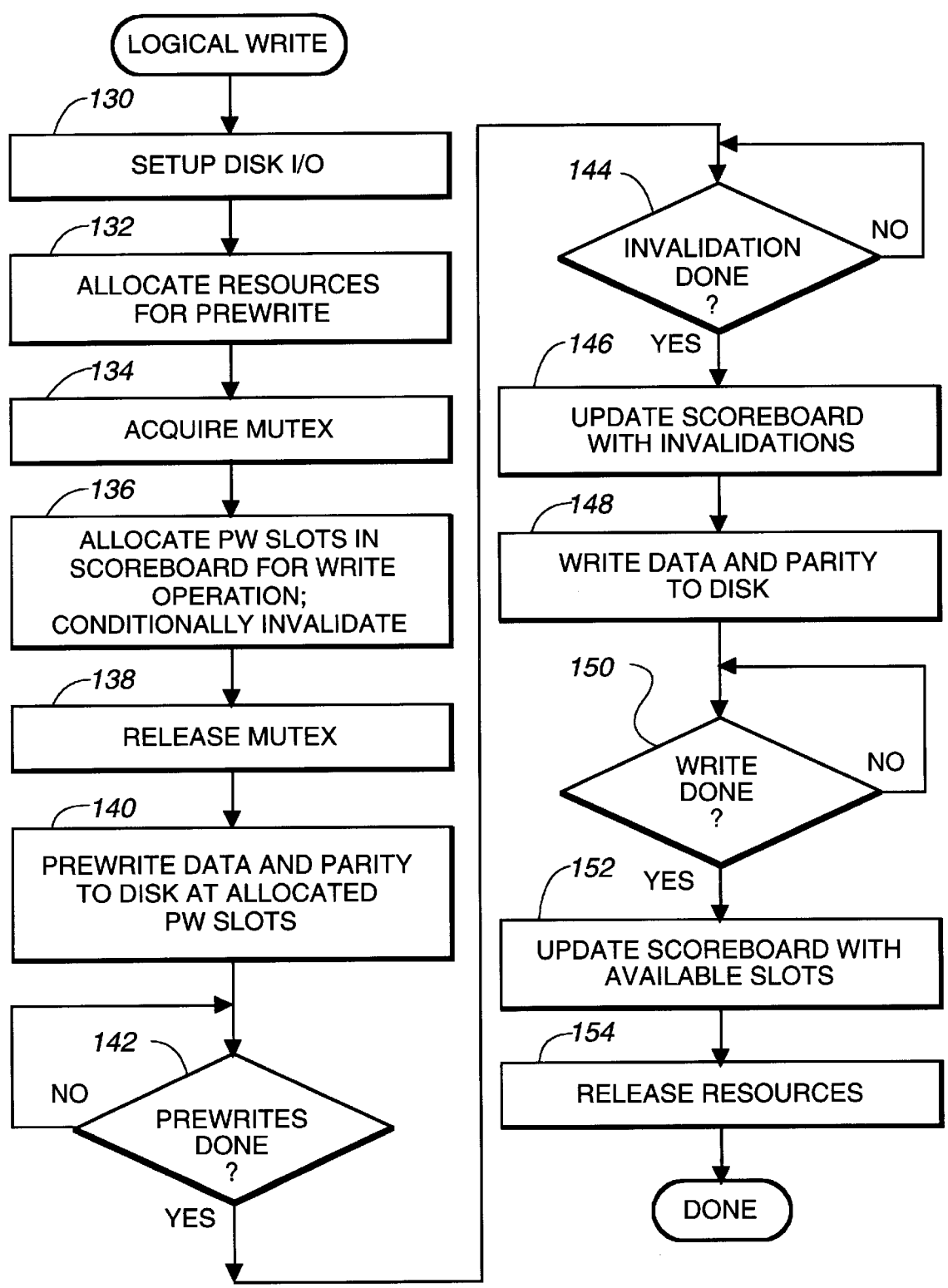
FIG. 8 illustrates an embodiment of the present invention for prewriting and writing data and parity to a disk in accordance with the present invention.

Referring to FIG. 8, another embodiment of the present invention is illustrated showing the prewrite and write operations to the RAID disk array. These operations are performed in response to a logical write request of new data to the RAID device. Operation 130 sets up the necessary blocks to be used for the disk operation (i.e., determining the number of blocks to be used to satisfy this logical write operation). Operation 132 allocates the resources of the computing system necessary for the prewrite operation. These resources include memory buffers for parity and data information to be used to satisfy this write operation.

Operation 134 acquires the mutex on the memory scoreboard to prevent any conflicting accesses to the scoreboard. Allocation operation 136 allocates the prewrite slots in the scoreboard for this write operation and conditionally invalidates any prewrite slots which require invalidation under the present invention. Operation 136 is described in greater detail in FIG. 9. Upon completion of operation 136, the mutex on the memory scoreboard is released at operation 138.

Prewrite operation 140 then prewrites the data and parity to the disk at the prewrite slot allocated by operation 136. Decision operation 142 determines if the prewrites have completed and, if so, decision operation 144 determines if the invalidations are completed.

Upon completion of the prewrites and the invalidations, if any, scoreboard update operation 146 updates the scoreboard with any invalidations which occurred at operation 136. As will be shown in FIG. 10A, operation 146 is performed under the mutex. Operation 148 then writes the data and parity to disk for storage therein. Operation 150 then determines if the write operation 148 has completed, and thereupon, operation 152 updates the scoreboard by marking the prewrite slots AVAILABLE that were used to temporarily store the data and parity information at operation 140. As will be shown in FIG. 10B, operation 152 is performed under the mutex. Operation 154 then releases the resources (i.e., buffers, etc.) which were used by operation 132.

Figure 9:
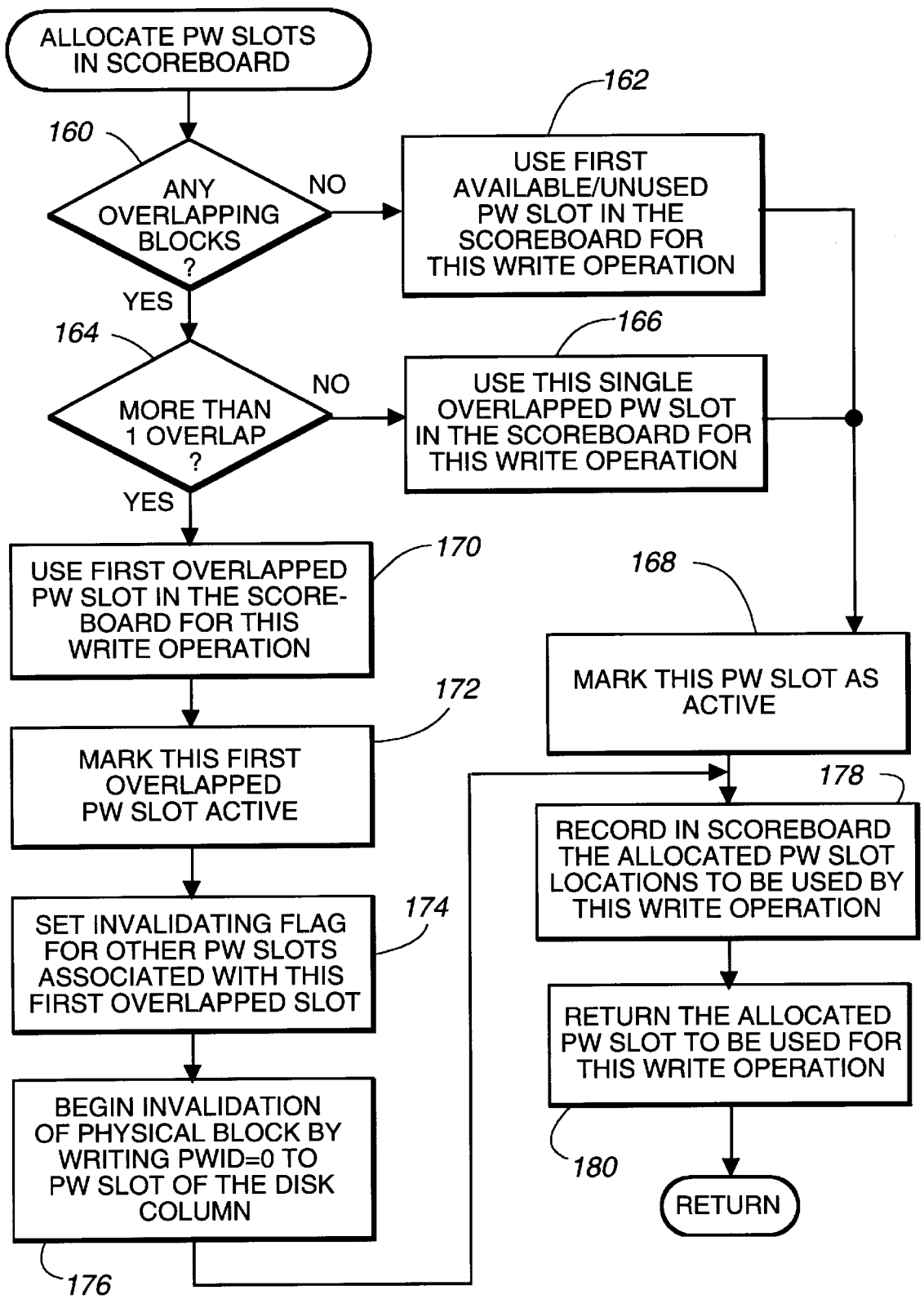
FIG. 9 illustrates the logical operations for allocating a prewrite slot in the scoreboard.

FIG. 9 shows the logical operations of the prewrite slot management operation 136 of FIG. 7. The operations shown in FIG. 9 are performed for each column in the prewrite scoreboard. Decision operation 160 determines if there any overlapping blocks associated with the current write operation and the available prewrite slots of the scoreboard. Operation 160 can be implemented by searching through each prewrite slot in a column of the scoreboard and testing for the same block numbers (block_no) and overlapping range of block numbers (i.e., block_no plus block_cnt). If operation 160 does not detect any overlaps, then the first AVAILABLE or UNUSED prewrite slot in the scoreboard should be used for this write operation, as shown in operation 162.

If there are overlapping blocks detected by operation 160, then decision operation 164 determines if there is more than one overlapping block. If not, then the single overlapped prewrite slot in the scoreboard should be used for this write operation, as shown by operation 166.

Both operations 162 and 166 pass control to operation 168 which mark the prewrite slot as ACTIVE by setting the ACTIVE flag in the prewrite scoreboard for this slot.

If operation 164 determines that there are more than one overlapping blocks, then operation 170 uses the first overlapped prewrite slot in the scoreboard for this write operation. Operation 172 marks this first overlapped prewrite slot as ACTIVE by setting the ACTIVE flag in the scoreboard. Operation 174 then sets the INVALIDATING flag for the other prewrite slots associated with the first overlapped prewrite slot. In this manner, only the prewrite slots which should be invalidated in order to avoid possible data corruption are invalidated by the present invention.

Operation 176 then begins invalidation of the physical blocks of the disk. It is understood that there are various methods for marking the contents of the prewrite slot as invalid, including using a flag or marker on the slot, setting an invalid block number or otherwise, depending on the implementation chosen. In one embodiment of the present invention, operation 176 performs the invalidation operation by writing a prewrite ID of 0 to the prewrite slot 66 of the disk column 60 of the RAID device 46 (FIG. 3A).

Control is then passed to operation 178. Operation 178 records in the scoreboard the allocated prewrite slot location to be used by this write operation. Operation 180 then returns the allocated prewrite slot so that it can be used for this write operation later in the prewrite process, further shown in FIG. 8.

Figure 10A:
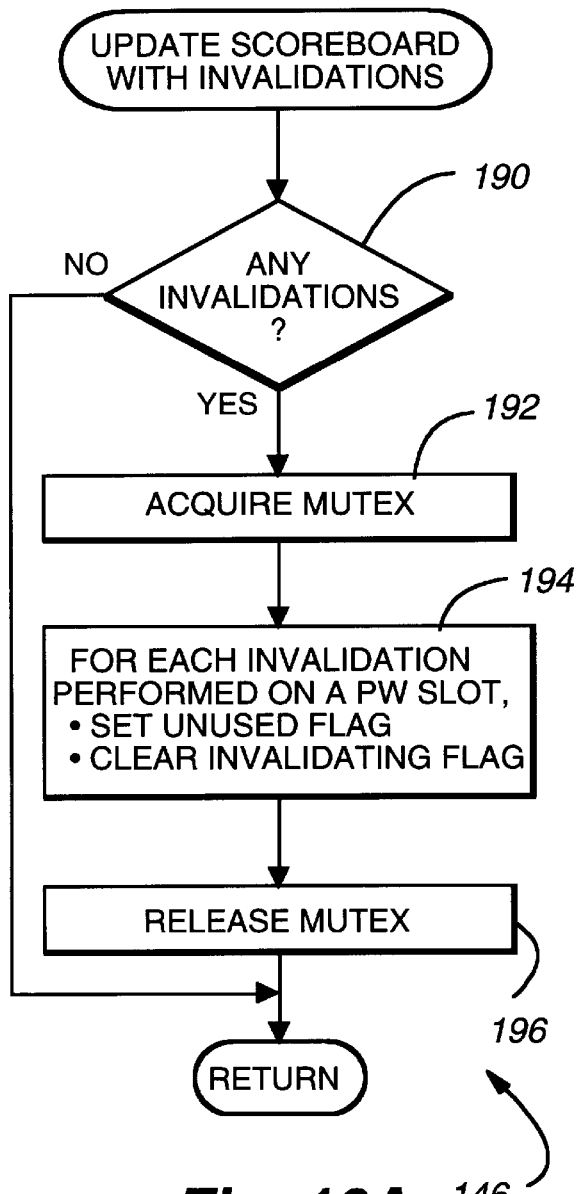
FIG. 10A shows the logical operations for updating the scoreboard with invalidations.
Figure 10B:
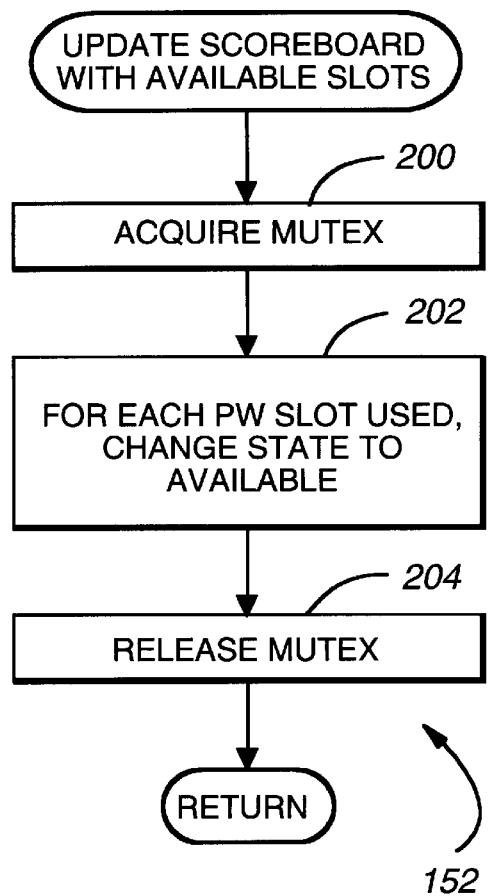
FIG. 10B shows the logical operations for updating the scoreboard with available prewrite slots.

With reference now to FIG. 10A and 10B, the operations 146 and 152 of FIG. 8 are respectively shown in greater detail. As shown in FIG. 10A, the scoreboard is updated with any invalidations which occurred during operation 136 of FIG. 8. Decision operation 190 determines if there are any invalidations which occurred. This decision operation can be implemented by testing the state of the invalidation flag described above. If so, operation 192 acquires the mutex on the scoreboard, and operation 194 sets the UNUSED flag and clears the INVALIDATING flag for each prewrite slot which had been invalidated. Operation 196 then releases the mutex and control is returned to operation 148 of FIG. 8. FIG. 10B illustrates the update operation which occurs after the data and parity is actually written to the disk by operation 148 of FIG. 8. Operation 200 acquires the mutex of the scoreboard, and operation 202 changes the state of each prewrite slot used to AVAILABLE. Operation 204 then releases the mutex on the scoreboard, and control is returned to operation 154 of FIG. 8.

According to the present invention as shown in the operations of FIGS. 6–9B, the present invention minimizes the number of invalidation operations which need to be performed. It has been found that by using the methods herein described, an approximate 25% performance improvement can be realized over a prewrite process which uses unconditional invalidation operations.

Figure 11A:
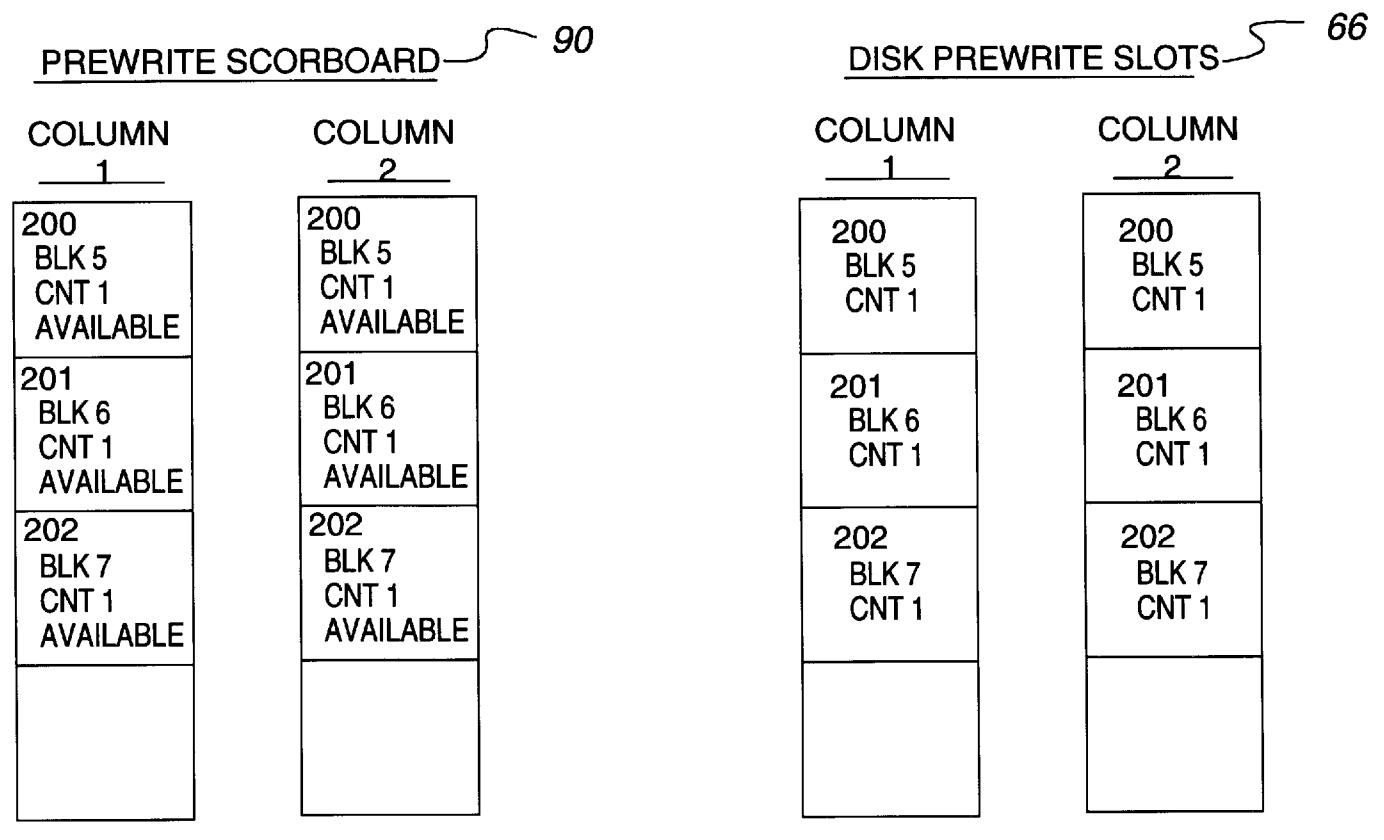
Figure 11B:
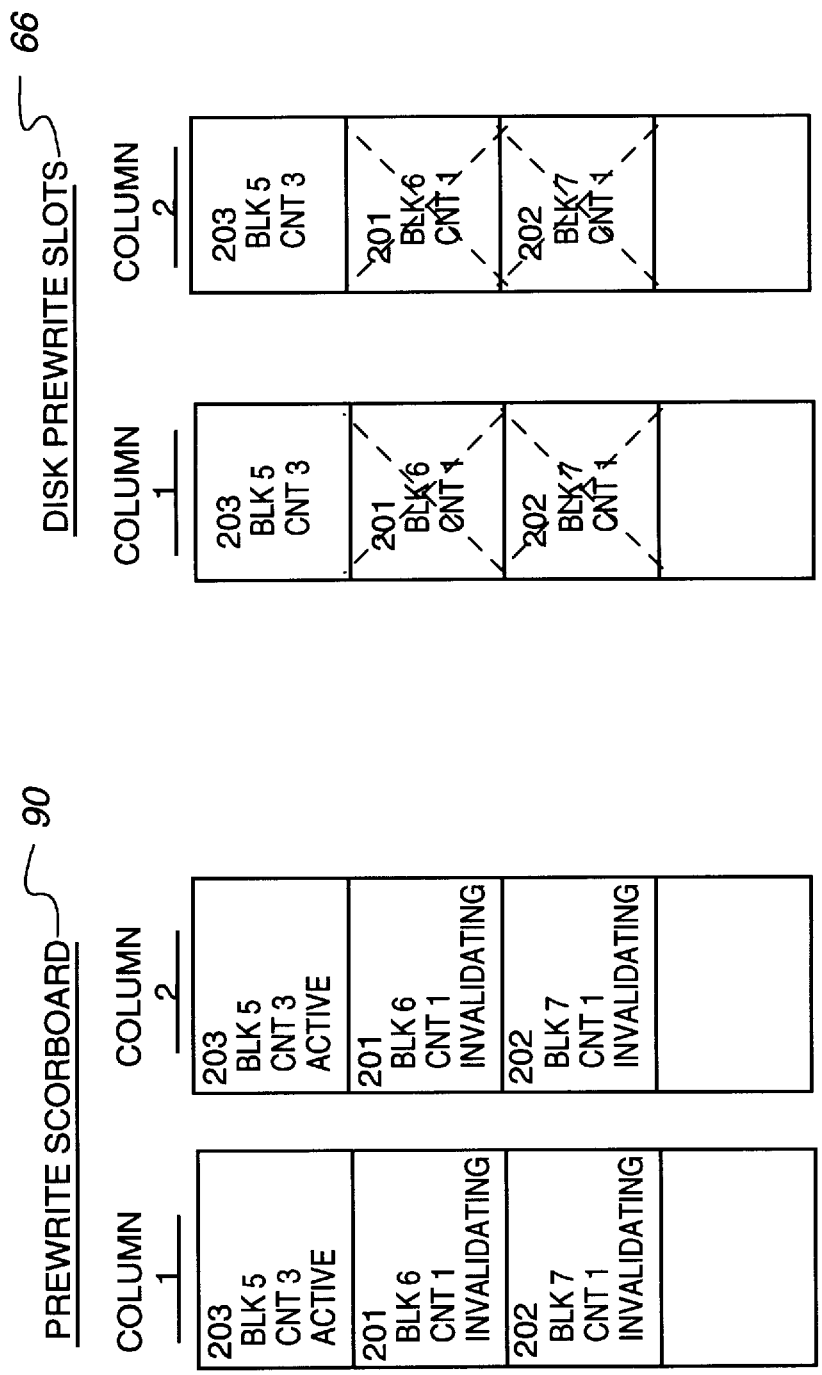
FIG. 11B shows a continuation of the example of FIG. 11A of the operation of the present invention.

FIGS. 11A–11C provide one example of the operation of the present invention. In this example, there is a two-column disk array having four prewrite slots per column, and correspondingly the prewrite scoreboard 90 has two columns and four prewrite slots per column. In this example, the initial conditions are that there have been three write operations having PWIDs of 200, 201, and 202, which have occurred. As indicated in the prewrite scoreboard 90, each of these prewrite slots is AVAILABLE, indicating that the data from the prewrite area was successfully transferred to the physical area of the disk. In accordance with the invention, however, the prewrite slots 66 have not been unconditionally invalidated. Instead, the present invention will determine if there is a need to invalidate any of the prewrite information contained in the disk prewrite slots 66. In this manner, the invalidation operation is optimally minimized, thereby improving the performance of the RAID disk array.

As can be seen in FIG. 11A, each prewrite slot 66 has a prewrite ID, a block number, and a block count. In FIG. 11A, there are no overlapping blocks. Now assume that the following situation occurs: a write operation with prewrite ID 203 at block 5 (block_no=5) having a block count of 3 (block_cnt=3) is initiated. Referring to FIG. 11A, since write operation 203 has a range from block 5 to block 7 (because the block count is 3), there will be an overlap with the blocks associated with prewrite slots 200, 201, and 202. This overlap with these prewrite slots occurs because the blocks associated with these prewrite slots overlap with the blocks associated with write operation 203. Since this is an overlap condition of more than one block, in accordance with the present invention, the prewrite slot associated with the First overlapped block will be allocated for the write operation 203. Further, the prewrite slots associated with the remaining overlaps blocks will be invalidated.

Referring to FIG. 11B, in the prewrite scoreboard 90, the prewrite slot formally associated with prewrite ID 200 is allocated and used for the write operation 203. This is because, as previously explained, this prewrite slot was associated with the first overlapped block (block_no of 5) of the write operation 203. The state of this prewrite slot in the scoreboard is changed to ACTIVE, and the states of the prewrite slots associated with the remaining overlapping blocks (block 6 and block 7 of prewrite ID 201 and 202 respectively) are changed to the INVALIDATING state. The invalidation process of the physical block in the disk prewrite slots 66 is then initiated. As previously described, the prewrite IDs of these blocks will be changed to zero indicating an invalid prewrite slot. Finally, the prewrite information for write operation 203 is written to the physical disk prewrite slots 66 at the appropriate prewrite slot.

Referring to FIG. 11C, once the invalidation of the disk prewrite slots 66 is completed, the prewrite scoreboard 90 is updated by changing the state of the prewrite scoreboard slots from INVALIDATING to UNUSED. The data contained in prewrite slots 66 for the write operation 203 is then transferred from the prewrite area to the physical location on the disk. Upon completion of this step, the prewrite scoreboard 90 is updated by changing the state of the prewrite slot for write operation 203 from ACTIVE to AVAILABLE.

This example illustrates the benefit of conditionally invalidating prewrite slots which have been detected as having overlapping blocks. The example shows that for four logical write operations, only two invalidation operations were required. Under the prior method of unconditionally invalidations described in FIG. 3, the same four logical write operations would require four invalidation operations. While the actual amount of the reduction of invalidation operations will vary with the nature of the write operations occurring in the RAID disk array, it can be seen that the present invention will reduce the number of invalidation operations performed by the RAID disk array.

Figure 12A:
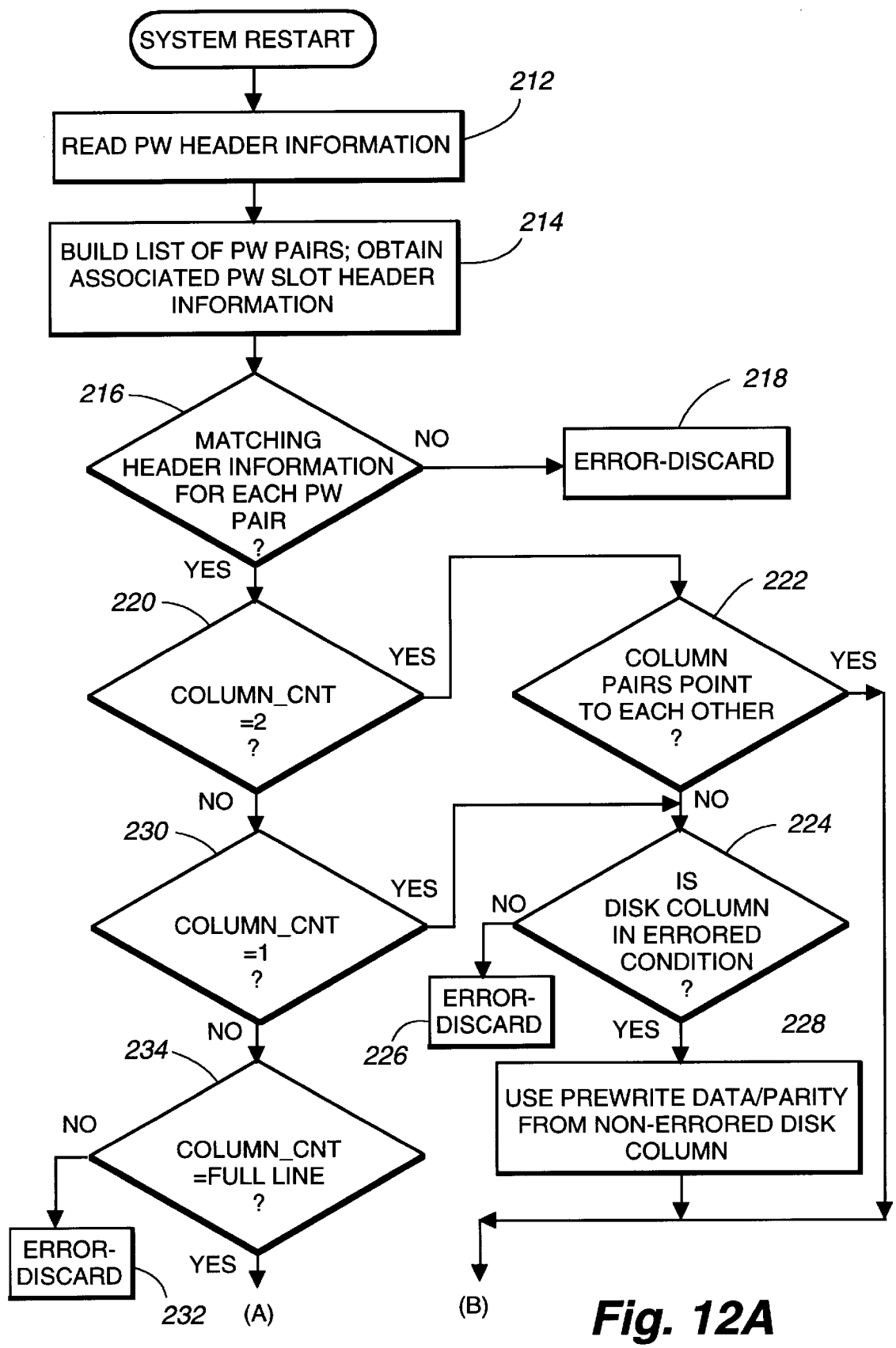
FIG. 12A shows the logical operations performed to replay or recover the data contained in the prewrite area of the disk after a system crash or restart.
Figure 12B:
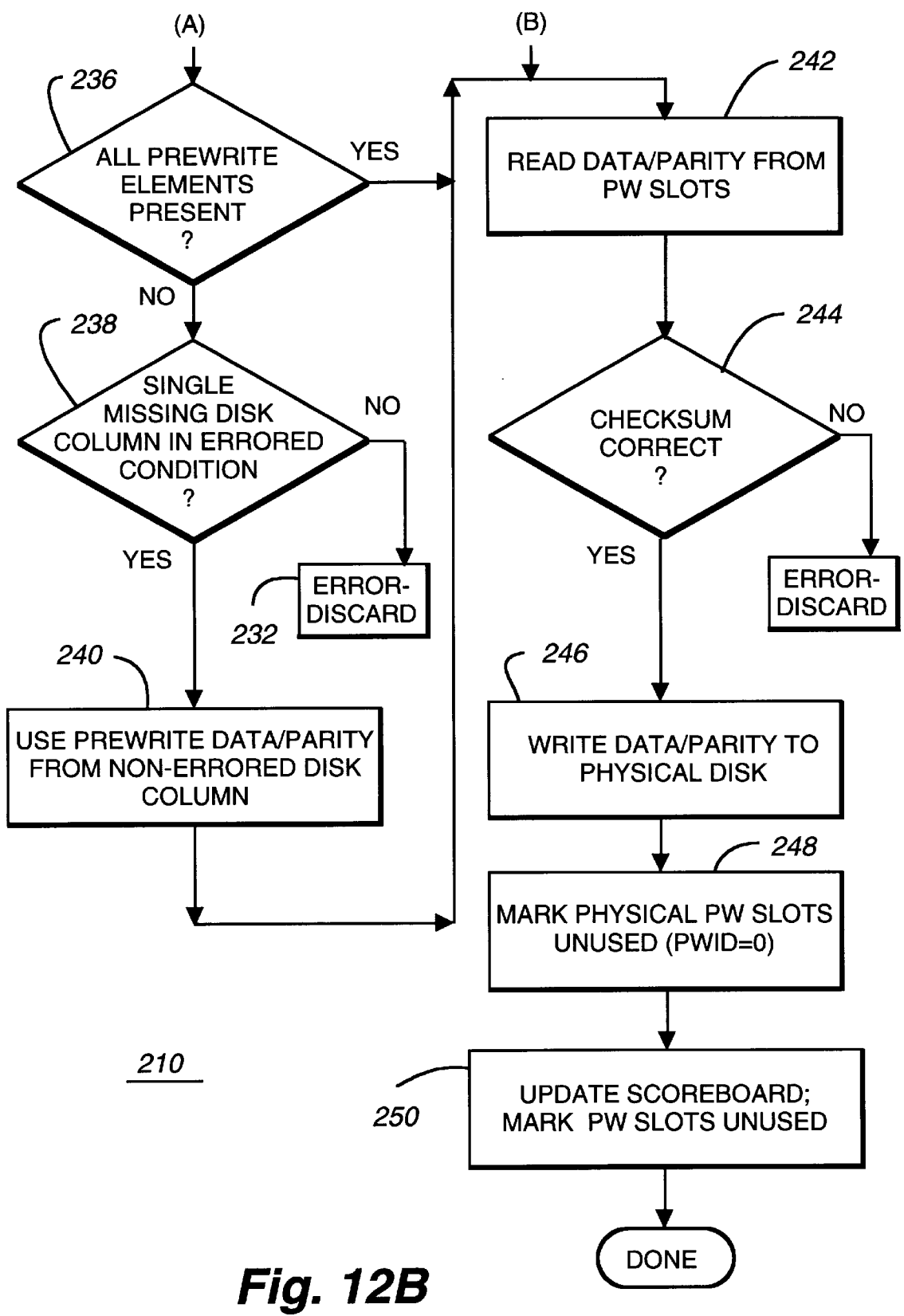
FIG. 12B is a continuation of the diagram of FIG. 12A showing the logical operations performed to replay or recover the data contained in the prewrite area of the disk after a system crash or restart.

Referring now to FIGS. 12A and 12B, the logical operations for restoring data from the prewrite regions of the RAID device are illustrated. The restoration, or "rolling" process, is typically performed at system reboot after a system crash or disorderly power down. If the prewrite area is empty (i.e., all prewrite regions on the disk are invalid), then there is no need to roll any information from the prewrite region. Generally, one approach to implementing the rolling process is to begin by reading all prewrites in the first disk column of the RAID array. Then all the prewrite information from the second column of the RAID array is read, and a comparison by prewrite identification is made to the prewrites of the first column to determine if there is a match. A list of matching pairs is thereby created using the column_pair variable 84 (FIG. 3B). The prewrite information from the third disk column is then read and compared again to add to the list of matching prewrite pairs. This process continues until all of the prewrite information from all of the disk columns has been compiled into a list of matching prewrite pairs or full lines.

Then from this list, the prewrite information of each element in the list is compared to ensure that each necessary piece is present (i.e., the same block number, the same block count, etc.). If all the prewrite data correctly matches, then the actual data from the prewrite slots is transferred from the prewrite area to the physical disk device appropriately.

If, however, all of the prewrite information for each of the elements in the list do not match, then if the corresponding column is in an errored condition, the data from the non-errored disk can be used for restoration; otherwise, if neither of the disk columns is in an errored state, the information is discarded as erroneous. Particularly, for a full line replay, if one of the disk columns is in an errored state, the data from the non-errored disk will be used to roll the data from the prewrite area to the physical disk. This is consistent with the RAID characteristic (i.e., RAID-5) of tolerance of a single disk failure.

For a replay of a regular write operation, if the column count equals 2 (column_cnt=2) and there is less than the full amount of information in each column, and neither column is in an errored state, then the prewrite information is discarded and not restored. This is because this prewrite operation was merely an incomplete operation before the system crashed, and no data should be restored from it.

FIGS. 12A and 12B illustrate the rolling operation described above. Operation 212 reads the prewrite header information for the given column. Operation 214 then builds a list of prewrite pairs or sets and obtains the associated prewrite slot header information previously described.

Decision operation 216 determines if each prewrite pair has matching header information. If not, the data is discarded as being erroneous at operation 218. Otherwise, control is passed to operation 220 which determines if the column count equals 2 (for a normal write operation). If so, decision operation 222 determines if the column pairs point to each other. If the column pairs do not point to each other, then operation 224 determines if either of the disk columns is in an errored condition. If not, then the information is discarded as erroneous at operation 226. If, however, one of the two disk columns is an errored condition, then operation 228 uses the prewrite's data/parity from the non-errored disk column for restoration, as will be described below.

Returning to operation 222, if the column pairs variable (column_pair) for a normal write operation point to each other, then the prewrite data/parity will be rolled to the RAID device.

Referring now to operation 220, if the column count is not equal to 2, then decision operation 230 determines if the column count is equal to 1. If so, then there is only one column associated with the logical write operation. Control is passed to decision operation 224, described above, to determine if the data in the single disk column should be used and replayed at operation 228, or discarded at operation 226.

If operation 230 determines that the column count is not equal to 1, then decision operation 234 determines if the column count equals the total number of columns in the RAID disk array (i.e., a full line write). If not, the data from the prewrite slot is discarded at operation 232. If decision operation 234 determines that this is a full line write, then decision operation 236 determines if all prewrite elements are present in each of the columns. If so, then the data from the prewrite slots will be restored to the RAID device.

If not all the prewrite elements are present in the full line, then decision operation 238 determines if only a single missing disk column exists and if it is in an errored condition. If so, operation 240 uses the prewrite data/parity from the non-errored disk columns for data restoration. Otherwise, the data is discarded at operation 232.

Operation 242 reads the data/parity from the prewrite slots for restoration to the RAID device. Decision operation 244 performs a checksum calculation on the data/parity read from the prewrite slots and if the checksum is correct, operation 246 writes the data/parity to the physical disk. Operation 248 then marks the physical prewrite slots as UNUSED by setting the prewrite ID to 0 for these prewrite slots. Operation 250 then updates the scoreboard by marking the respective scoreboard slots as UNUSED. The replay or rolling process of the data in the prewrite region is then completed.

While the present invention has been described with respect to RAID storage devices, it is understood that the methods taught by present invention could be used in a computing system where it would be important to insure the consistency or synchronization of two or more blocks of associated data written to an I/O device, such as a tape drive. In particular, the prewrite process described herein, as well as the rolling processes, could be used to ensure that the two or more blocks of associated data are properly written to the I/O device despite a possible failure in the I/O device.

While the invention has been particularly shown and described with reference to a preferred embodiment thereof, it will be understood by those skilled in the art that various other changes in the form and details may be made without departing from the spirit and scope of the invention.

What is claimed is:

1. A method for writing new data in a computing system having a system memory and at least two storage devices located remote from the system memory and arranged in a RAID configuration, a first storage device and a storage device of said at least two storage devices each having first and second prewrite slots for pre-storage of data and parity information, the method of comprising the steps of:

providing a structure in the system memory for tracking a state of said first and second prewrite slots, located remote from the system memory;

calculating a new parity from the new data, an old parity value, and an old data value stored in the computing system;

allocating one of said first and second prewrite slots for recording the new data in said first storage device and the new parity in said second storage device;

detecting at said structure provided in the system memory during said step of providing and responsive to states of said first and second prewrite slots, of an overlap condition associated with said prewrite slots, each prewrite slot to which the overlap condition is associated defined to be an overlapped prewrite slot;

conditionally invalidating said prewrite slots, said prewrite slots invalidated if detected during said step of detecting to be overlapped prewrite slots; otherwise storing, in said prewrite slot allocated by said allocation step, the new data to said first storage device and the new parity to said second storage device;

writing the new data to said first storage device; and writing the new parity to said second storage device.

2. The method of claim 1, wherein said providing step further comprises:

assigning an identification variable for associating said data and parity in said first and second prewrite slots across said first and second storage devices; and assigning a block variable to each identification variable corresponding to a range of blocks occupied with the storage devices.

3. The method of claim 2, wherein said detection step further comprises:

comparing said block variable of a prewrite slot to a block variable of an allocated prewrite slot to detect if the block variable of said prewrite slot matches the block variable of the allocated prewrite slot.

4. The method of claim 1, wherein said providing step further comprises:

forming said structure to contain a set of state variables associated with each of said first and second prewrite slots, said set of state variables comprising an UNUSED state variable for indicating that said prewrite slot has not been occupied and can be allocated, an ACTIVE state variable for indicating that said prewrite slot has been allocated and is currently being processed, an AVAILABLE state variable indicating that said prewrite slot is available for allocation, and an INVALIDATING state variable indicating that said prewrite slot is currently being conditionally invalidated.

5. The method of claim 1, wherein said conditionally invalidating step further comprises:

marking said prewrite slot with an identifier indicating that the parity and data information contained in the prewrite slot are invalid.

6. An apparatus for storing data in a computing system, the apparatus comprising:

a first and second storage device for storage of the data, each storage device having at least a first and second prewrite slot for pre-storage of the data;

a memory structure coupled to, and formed remote from said first and second storage devices for tracking a state of said first and second prewrite slots;

a detection module coupled to said memory structure, said detection module for monitoring said memory structure to detect an overlap condition associated with at least one of said first and second prewrite slots;

an allocation module, coupled to said memory structure and to said first and second storage devices, for allocating one of said first and second prewrite slots for pre-storing said data in said slot; and an invalidation module, coupled to said detection module and to said first and said second storage device, said invalidation module for marking at least one of said first and second prewrite slots invalid responsive to detection by said detection module of the overlap condition.

7. The apparatus of claim 6, wherein said first and second storage devices are disk drives arranged in a RAID-1 configuration.

8. The apparatus of claim 6, wherein said first and second storage devices are disk drives arranged in a RAID-4 configuration.

9. The apparatus of claim 6, wherein said first and second storage devices are disk drives arranged in a RAID-5 configuration.

10. The apparatus of claim 6, wherein said memory structure has an identification variable for associating said data and parity in said first and second prewrite slots across said first and second storage devices; and a block variable to each identification variable corresponding to a range of blocks occupied with the storage devices.

11. The apparatus of claim 6, wherein said memory structure contains a set of state variables associated with each of said first and second prewrite slots, said set of state variables comprising an UNUSED state variable for indicating that said prewrite slot has not been occupied and can be allocated, an ACTIVE state variable for indicating that said prewrite slot has been allocated and is currently being processed, an AVAILABLE state variable indicating that said prewrite slot is available for allocation, and an INVALIDATING state variable indicating that said prewrite slot is currently being conditionally invalidated.

12. The apparatus of claim 10 wherein said detection module compares said block variable of a prewrite slot to a block variable of an allocated prewrite slot to detect if the block variable of said prewrite slot matches the block variable of the allocated prewrite slot.

13. A computer program storage medium readable by a computing system and encoding a computer program of instructions for executing a computer process for writing new data in a computing system having a system memory and at least two storage devices located remote from the system memory and arranged in a RAID configuration, a first storage device and a storage device of said at least two storage devices each having first and second prewrite slots for pre-storage of data and parity information, the computer process comprising the steps of:

providing a structure in the system memory for tracking a state of said first and second prewrite slots;

calculating a new parity from the new data, an old parity value, and an old data value stored in the computing system;

allocating one of said first and second prewrite slots for recording the new data in said first storage device and the new parity in said second storage device;

detecting at said structure, provided in the system memory during said step of providing and responsive to states of said first and second prewrite slots, of an overlap condition associated with said prewrite slots, each prewrite slot to which the overlap condition is associated defined to be an overlapped prewrite slot;

conditionally invalidating said prewrite slots, said prewrite slots invalidated if detected during said step of detecting to be overlapped prewrite slots;

storing, in said prewrite slot allocated by said allocation step, the new data to said first storage device and the new parity to said second storage device;

writing the new data to said first storage device; and writing the new parity to said second storage device.

14. The computer program storage medium of claim 13 where the computer process further comprises the steps of:

assigning an identification variable for associating said data and parity in said first and second prewrite slots across said first and second storage devices; and assigning a block variable to each identification variable corresponding to a range of blocks occupied with the storage devices.

15. The computer program storage medium of claim 14 where the computer process of detection further comprises the steps of:

comparing said block variable of a prewrite slot to a block variable of an allocated prewrite slot to detect if the block variable of said prewrite slot matches the block variable of the allocated prewrite slot.

* * * * *